US011063522B2

(12) United States Patent
Jin et al.

(10) Patent No.: US 11,063,522 B2
(45) Date of Patent: Jul. 13, 2021

(54) CONVERTER FOR IMPROVING CONVERSION EFFICIENCY

(71) Applicant: DELTA ELECTRONICS, INC., Taoyuan (TW)

(72) Inventors: Da Jin, Taoyuan (TW); Xue-Liang Chang, Taoyuan (TW); Ya-Hong Xiong, Taoyuan (TW); Qing-Hua Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/776,464

(22) Filed: Jan. 29, 2020

(65) Prior Publication Data

US 2020/0251999 A1 Aug. 6, 2020

(30) Foreign Application Priority Data

Feb. 1, 2019 (CN) .......................... 201910104762.9

(51) Int. Cl.
*H02M 3/335* (2006.01)
*H02M 1/00* (2006.01)

(52) U.S. Cl.
CPC ......... *H02M 3/33576* (2013.01); *H02M 1/00* (2013.01); *H02M 2001/0048* (2013.01)

(58) Field of Classification Search
CPC .. H02M 3/33576; H02M 3/0058; H02M 1/00; H02M 2001/0048
See application file for complete search history.

(56) References Cited

U.S. PATENT DOCUMENTS

| 4,383,292 | A | 5/1983 | Onodera et al. |
| 7,184,280 | B2 | 2/2007 | Sun et al. |
| 8,456,867 | B1 * | 6/2013 | Karlsson ............. H02M 3/3378 363/17 |
| 9,116,488 | B2 | 8/2015 | Shinohara |

(Continued)

FOREIGN PATENT DOCUMENTS

| CN | 1614863 A | 5/2005 |
| CN | 101399492 A | 4/2009 |

(Continued)

*Primary Examiner* — Yusef A Ahmed
(74) *Attorney, Agent, or Firm* — CKC & Partners Co., LLC

(57) ABSTRACT

A converter includes an input capacitor, a primary-side switching circuit, a magnetic element circuit, a secondary-side switching circuit, and an output capacitor. Primary-side switching circuit includes a first positive voltage terminal and a first negative voltage terminal. First positive voltage terminal is coupled to one terminal of an input voltage. First negative voltage terminal and first positive voltage terminal are coupled to the input capacitor. Magnetic element circuit is coupled to primary-side switching circuit. Secondary-side switching circuit is coupled to magnetic element circuit. Secondary-side switching circuit includes a second positive voltage terminal and a second negative voltage terminal. Second positive voltage terminal is coupled to first negative voltage terminal. Second negative voltage terminal is coupled to another terminal of the input voltage, and second negative voltage terminal and second positive voltage terminal output an output voltage together. Output capacitor is coupled to secondary-side switching circuit.

14 Claims, 11 Drawing Sheets

(56) References Cited

U.S. PATENT DOCUMENTS

| | | | |
|---|---|---|---|
| 9,496,793 B2 * | 11/2016 | Bruwer | G01R 27/2605 |
| 9,621,053 B1 | 4/2017 | Telefus | |
| 9,748,851 B2 * | 8/2017 | Muto | H02M 1/34 |
| 10,298,137 B2 * | 5/2019 | Hsu | H02M 3/33523 |
| 10,340,805 B2 * | 7/2019 | Kovacevic | H02M 3/33523 |
| 10,714,977 B2 * | 7/2020 | Ichikawa | G01R 15/06 |
| 10,819,222 B2 | 10/2020 | Scherbaum | |
| 2009/0244934 A1 | 10/2009 | Wang et al. | |
| 2010/0067259 A1 * | 3/2010 | Liu | H02M 3/33569 |
| | | | 363/21.01 |
| 2011/0194206 A1 | 8/2011 | Sase et al. | |
| 2012/0033455 A1 * | 2/2012 | Hosotani | H02M 1/38 |
| | | | 363/21.03 |
| 2014/0268891 A1 | 9/2014 | Sigamani et al. | |
| 2014/0268894 A1 * | 9/2014 | Shinohara | H02M 3/3376 |
| | | | 363/17 |
| 2014/0286056 A1 | 9/2014 | Yoon et al. | |
| 2015/0138844 A1 * | 5/2015 | Karlsson | H02M 3/33592 |
| | | | 363/21.1 |
| 2016/0099651 A1 * | 4/2016 | Ishigaki | H02M 3/33584 |
| | | | 363/21.05 |
| 2016/0172983 A1 * | 6/2016 | Huang | H02M 3/33507 |
| | | | 363/21.12 |
| 2016/0359419 A1 | 12/2016 | Lin et al. | |
| 2017/0179831 A1 | 6/2017 | Yu et al. | |
| 2017/0294844 A1 | 10/2017 | Nishijima | |
| 2018/0034359 A1 * | 2/2018 | Chen | H02M 3/33592 |
| 2018/0131285 A1 | 5/2018 | Stuler | |
| 2018/0138815 A1 * | 5/2018 | Yamada | H02M 3/07 |
| 2020/0076316 A1 * | 3/2020 | Jin | H02M 3/33576 |
| 2020/0099309 A1 * | 3/2020 | Jin | H02M 3/33569 |
| 2020/0251998 A1 * | 8/2020 | Jin | H02M 3/33576 |

FOREIGN PATENT DOCUMENTS

| | | |
|---|---|---|
| CN | 102185493 A | 9/2011 |
| CN | 102761276 A | 10/2012 |
| CN | 202737771 U | 2/2013 |
| CN | 103532390 A | 1/2014 |
| CN | 103762840 A | 4/2014 |
| CN | 104300769 A | 1/2015 |
| CN | 105934876 A | 9/2016 |
| CN | 107171563 A | 9/2017 |
| CN | 108667384 A | 10/2018 |
| EP | 2458723 A1 | 5/2012 |
| TW | 200713677 A | 4/2007 |

\* cited by examiner

CONVERTER FOR IMPROVING CONVERSION EFFICIENCY

RELATED APPLICATIONS

This application claims priority to China Application Serial Number 201910104762.9, filed Feb. 1, 2019, which is herein incorporated by reference.

BACKGROUND

Field of Invention

The present disclosure relates to a voltage conversion device. More particularly, the present disclosure relates to a converter.

Description of Related Art

In order to further increase the efficiency of conversion system, a bus converter usually uses a converter with a transformer, such as a traditional pulse width modulation (PWM) hard-switching circuit topology, an LLC series resonant circuit, a switched capacitor converter circuit with a transformer, etc. These bus converters do not require isolation of the primary and secondary sides of the transformer. In conventional applications, the input ground terminal Vin− and the output ground terminal Vo− are generally shorted together, which can facilitate the arrangement of ground lines of the primary and secondary sides and in turn is beneficial to the setting of the driving signals of the primary-side and secondary-side switches. However, the primary current flows into the ground line via the Vin− terminal in these applications, thus causing a certain degree of loss.

For the foregoing reasons, there is a need to solve the above-mentioned problems by providing a converter, which satisfies the needs for high efficiency and high power density of a converter.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

A converter is provided. The converter comprises an input capacitor, a primary-side switching circuit, a magnetic element circuit, a secondary-side switching circuit, and an output capacitor. The primary-side switching circuit comprises a first positive voltage terminal and a first negative voltage terminal. The first positive voltage terminal is coupled to one terminal of an input voltage. The first negative voltage terminal and the first positive voltage terminal are coupled to the input capacitor. The magnetic element circuit is coupled to the primary-side switching circuit. The secondary-side switching circuit is coupled to the magnetic element circuit. The secondary-side switching circuit comprises a second positive voltage terminal and a second negative voltage terminal. The second positive voltage terminal is coupled to the first negative voltage terminal. The second negative voltage terminal is coupled to another terminal of the input voltage, and the second negative voltage terminal and the second positive voltage terminal output an output voltage together. The output capacitor is coupled to the secondary-side switching circuit.

Therefore, the embodiments of the present disclosure provide a converter to change the transformer ratio of the transformer by short-circuiting the first negative voltage terminal on the primary side (the first side) and the second positive voltage terminal on the secondary side (the second side) of the converter. The number of winding turns of the primary-side winding of the transformer is reduced, and the turn-on loss of the transformer is reduced at the same time to improve the conversion efficiency of the converter.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

As used herein, "couple" refers to direct physical contact or electrical contact or indirect physical contact or electrical contact between two or more elements. Or it can also refer to reciprocal operations or actions between two or more elements.

Figure 1A:
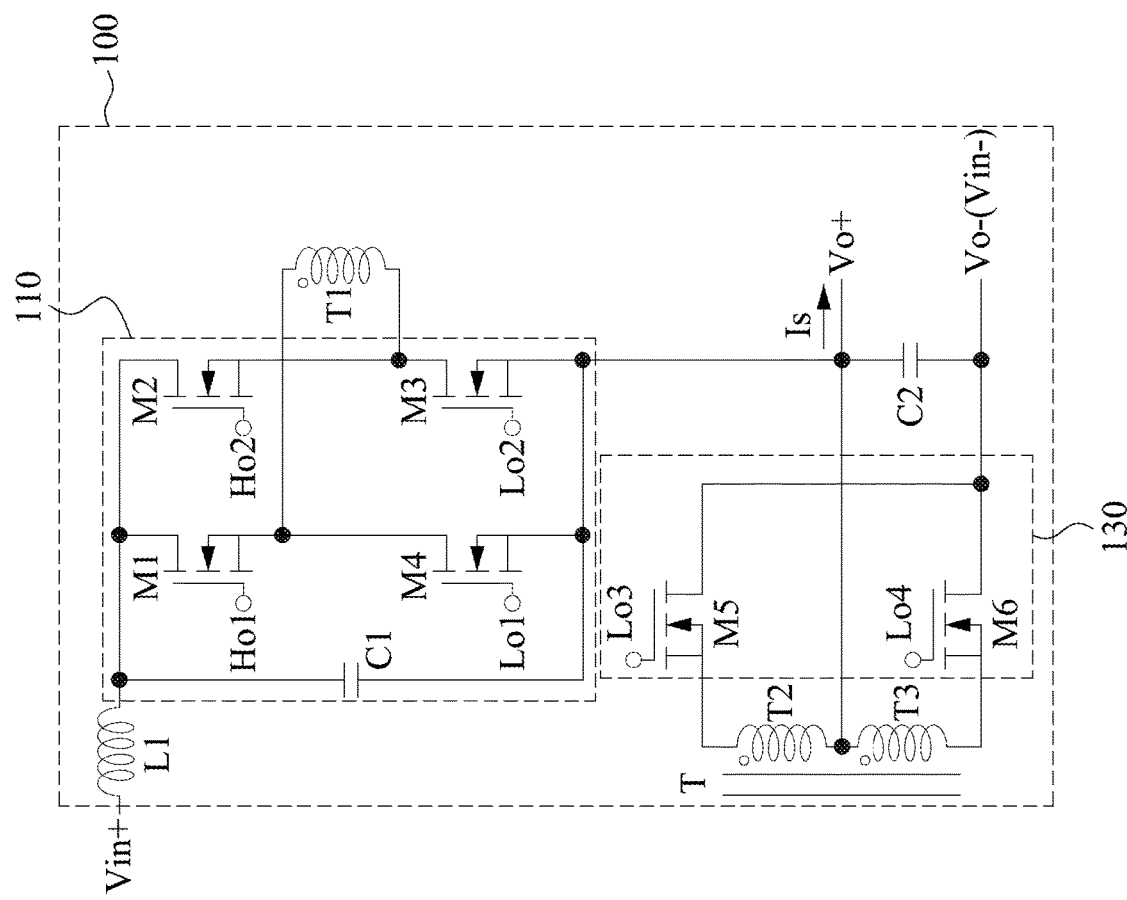
FIG. 1A depicts a schematic diagram of a circuit of a converter according to one embodiment of the present disclosure.

FIG. 1A depicts a schematic diagram of a circuit of a converter according to one embodiment of the present disclosure. As shown in the figure, the converter 100 includes an input inductor L1, an input capacitor C1, a primary-side switching circuit 110, a magnetic element circuit, a secondary-side switching circuit 130, and an output capacitor C2. The primary-side switching circuit 110 includes a first positive voltage terminal and a first negative voltage terminal. The secondary-side switching circuit 130 includes a second positive voltage terminal and a second negative voltage terminal. An input voltage Vin is loaded between the first positive voltage terminal and the second negative voltage terminal, and an output voltage Vo is loaded between the second positive voltage terminal and the second negative voltage terminal.

The first positive voltage terminal and the first negative voltage terminal of the primary-side switching circuit 110 are coupled to the input capacitor C1. The magnetic element circuit is coupled to the primary-side switching circuit 110. The secondary-side switching circuit 130 is coupled to the magnetic element circuit. The second positive voltage terminal of the secondary-side switching circuit 130 is coupled to the first negative voltage terminal of the primary-side switching circuit 110. The second positive voltage terminal and the second negative voltage terminal of the secondary-side switching circuit 130 output an output voltage Vo together. The output capacitor C2 is coupled to the secondary-side switching circuit 130.

In other words, the converter 100 according to the present disclosure has a transformer, and isolation between the primary-side switching circuit 110 and the secondary-side switching circuit 130 is not needed. As shown in FIG. 1A, the first negative voltage terminal of the primary-side switching circuit 110 is shorted with the second positive voltage terminal of the secondary-side switching circuit 130.

A description is provided with reference to FIG. 1A. In one embodiment, the transformer of the magnetic element circuit includes at least one magnetic core, at least one primary-side winding T1, and at least one secondary-side winding including at least two windings T2, T3. The at least one primary-side winding T1 is coupled to the primary-side switching circuit 110. The at least two windings T2, T3 are coupled to the secondary-side switching circuit 130. The at least one primary-side winding T1 and the at least two windings T2, T3 are coupled through the at least one magnetic core. In another embodiment, the primary-side switching circuit 110 is implemented by using a full bridge switching circuit, and the secondary-side switching circuit 130 is implemented by using a full wave rectifier circuit. In addition, the at least two windings T2, T3 of the transformer of the magnetic element circuit are connected in series with each other, and a connection point of the at least two windings T2, T3 includes a center tap. The at least one secondary-side winding of the transformer of the magnetic element circuit and the secondary-side switching circuit 130 form a center-tapped full wave rectifier circuit. In other embodiments, the secondary-side switching circuit 130 includes a full bridge rectifier circuit.

In a converter with isolation (not shown in the figure), a transformer ratio of the primary-side winding to the secondary-side winding (that is, winding of a first side to winding of a second side) of the transformer of the converter is N:1:1, and the secondary current of the converter is Is=N·(Ip−Ilm), here the oscillating current Ip is a sum of currents flowing through switches of the primary-side switching circuit 110 (that is, the current Ip1+Ip2 shown in FIG. 2), and Ilm is the magnetizing current flowing through the primary-side winding of the transformer. A description is provided with reference to FIG. 1A, a voltage across two terminals of the primary-side winding of the transformer is Vp=Vin−Vo because the primary current flows into the second positive voltage terminal on the secondary side through the primary-side winding. The transformer ratio of the primary-side winding to the secondary-side winding of the transformer is (N−1):1:1 if the same output power of the converter is achieved. A description is provided with reference to FIG. 2.

Figure 2:
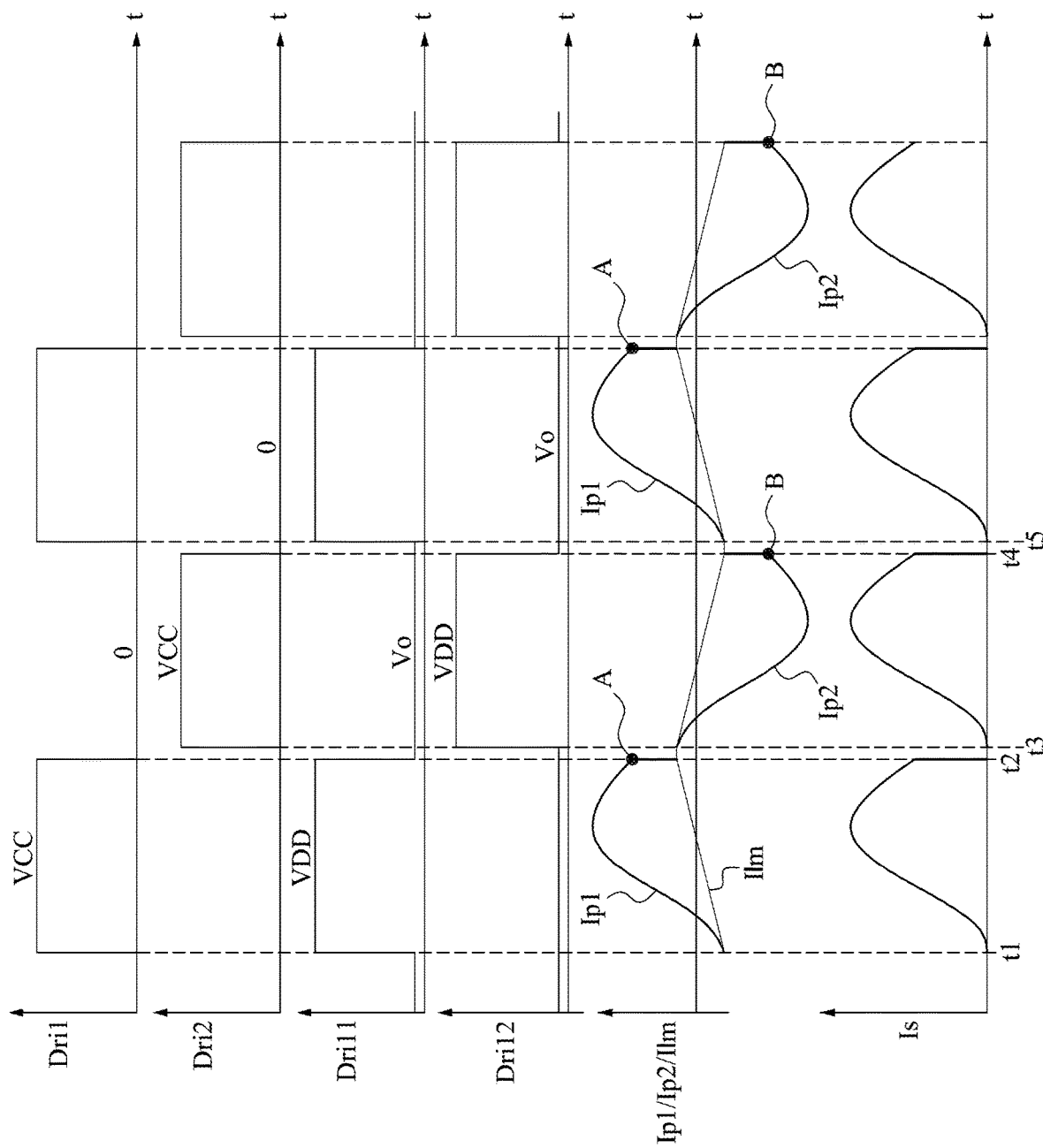
FIG. 2 depicts a schematic diagram of drive waveforms of a converter according to one embodiment of the present disclosure.

FIG. 2 depicts a schematic diagram of drive waveforms of the converter 100 according to one embodiment of the present disclosure. An output current Is is a total current, of which one part is the primary current that directly flows to the secondary-side load and the other part is the current that is transferred to the secondary side through the transformer. Take a duration t1−t2 as an example. When switches M1, M3, and M5 are turned on, a current flowing into the second positive voltage terminal on the secondary side from the primary side is (Ip1−Ilm), and the current transferred to the secondary side through the transformer is (N−1)·(Ip1−Ilm). The secondary current is Is=N·(Ip1−Ilm). As described above, the same energy transfer can be achieved with the transformer ratio of the transformer T1:T2:T3 being (N−1):1:1. Additionally, the decrease of number of winding turns of the primary-side winding of the transformer can reduce an on-resistance of the primary-side winding, that is, the turn-on loss of the primary-side winding can be reduced to $$\frac{N-1}{N}$$

of the original turn-on loss. For the secondary side, the turn-on loss of the secondary-side winding can be reduced to $$\left(\frac{N-1}{N}\right)^2$$

of the original turn-on loss at the same time since the current flowing through the secondary side is $$\frac{N-1}{N}$$

of the original secondary current. Owing to the change of the transformer ratio of the transformer caused by shorting the first negative voltage terminal on the primary side and the second positive voltage terminal on the secondary side, the number of winding turns of the primary-side winding of the transformer is reduced, and the turn-on loss of the transformer is reduced at the same time to improve the conversion efficiency of the converter.

Figure 1B:
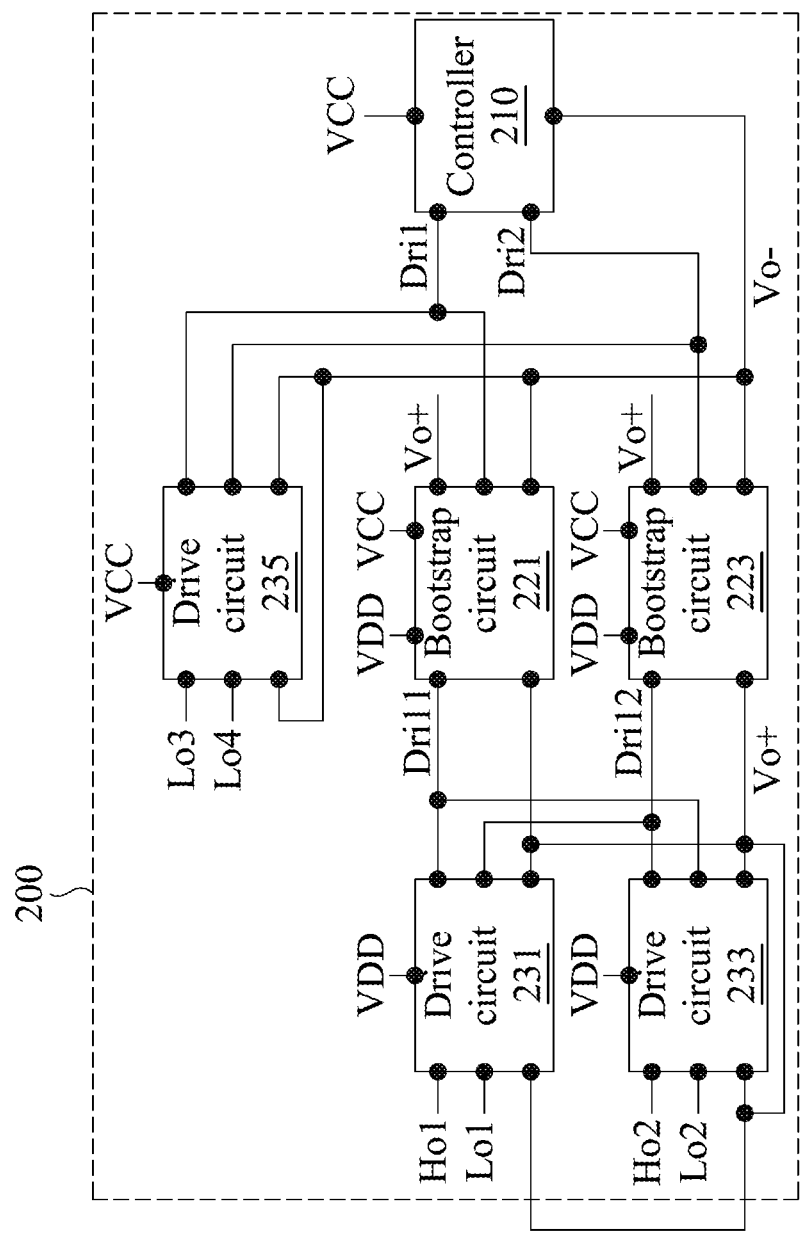
FIG. 1B depicts a schematic diagram of a circuit of a control device of a converter according to one embodiment of the present disclosure.

After the first negative voltage terminal on the primary side is shorted with the second positive voltage terminal on the secondary side, the input voltage is a voltage across the Vin+ terminal and the Vo− terminal, and primary and secondary switches cannot use the common ground drive mode. Drive signals for the primary switches should take the Vo+ terminal as a reference ground. In one embodiment, a description is provided with reference to the converter 100 and a control device 200 shown in FIG. 1A and FIG. 1B. Pulse width modulation signals Dri1 and Dri2 are pulse width modulation signals generated by a controller 210. A low level of the two signals is 0 and a high level of the two signals is VCC. The pulse width modulation signals Dri1 and Dri2 take the second negative voltage terminal as a reference ground. The drive signals Lo3 and Lo4 can be generated through a drive circuit 235 according to the pulse width control signals Dri1 and Dri2, so as to be configured to drive the secondary switches M5 and M6 respectively. For the primary switches, it is necessary to generate a power supply signal and control signals taking the second positive voltage terminal Vo+ as the reference ground which is generated by bootstrap circuits 221, 223. As shown in FIG. 1B, the control signals Dri11 and Dri12 and a power supply signal VDD is generated by the bootstrap circuits 221, 223 according to the pulse width control signals Dri1 and Dri2. The control signals Dri11 and Dri12 and the power supply signal VDD take the second positive voltage terminal Vo+ as the reference ground. Here, for ease of comparison, the pulse width of the control signals Dri11 and Dri12 are the same as that of the pulse width modulation signals Dri1 and Dri2. As shown in FIG. 2, the low level of the control signals Dri11 and Dri12 is Vo and the high level of the control signals Dri11 and Dri12 is VDD. Here, a voltage value of the power supply signal VDD relative to the second negative voltage terminal Vo− is VCC+Vo, and here voltage Vo is a voltage difference between the second positive voltage terminal Vo+ and the second negative voltage terminal Vo−. The drive signals Ho1 and Lo2 is generated by drive circuits 231, 233 according to the control signal Dri11, so as to be configured to drive the primary switches M1 and M3 respectively. The drive signals Ho2 and Lot are generated by the drive circuits 231, 233 according to the control signal Dri12, so as to be configured to drive the primary switches M2 and M4 respectively. The "ground" pins of the drive circuits 231, 233 are connected to the second positive voltage terminal of the converter.

Figure 3:
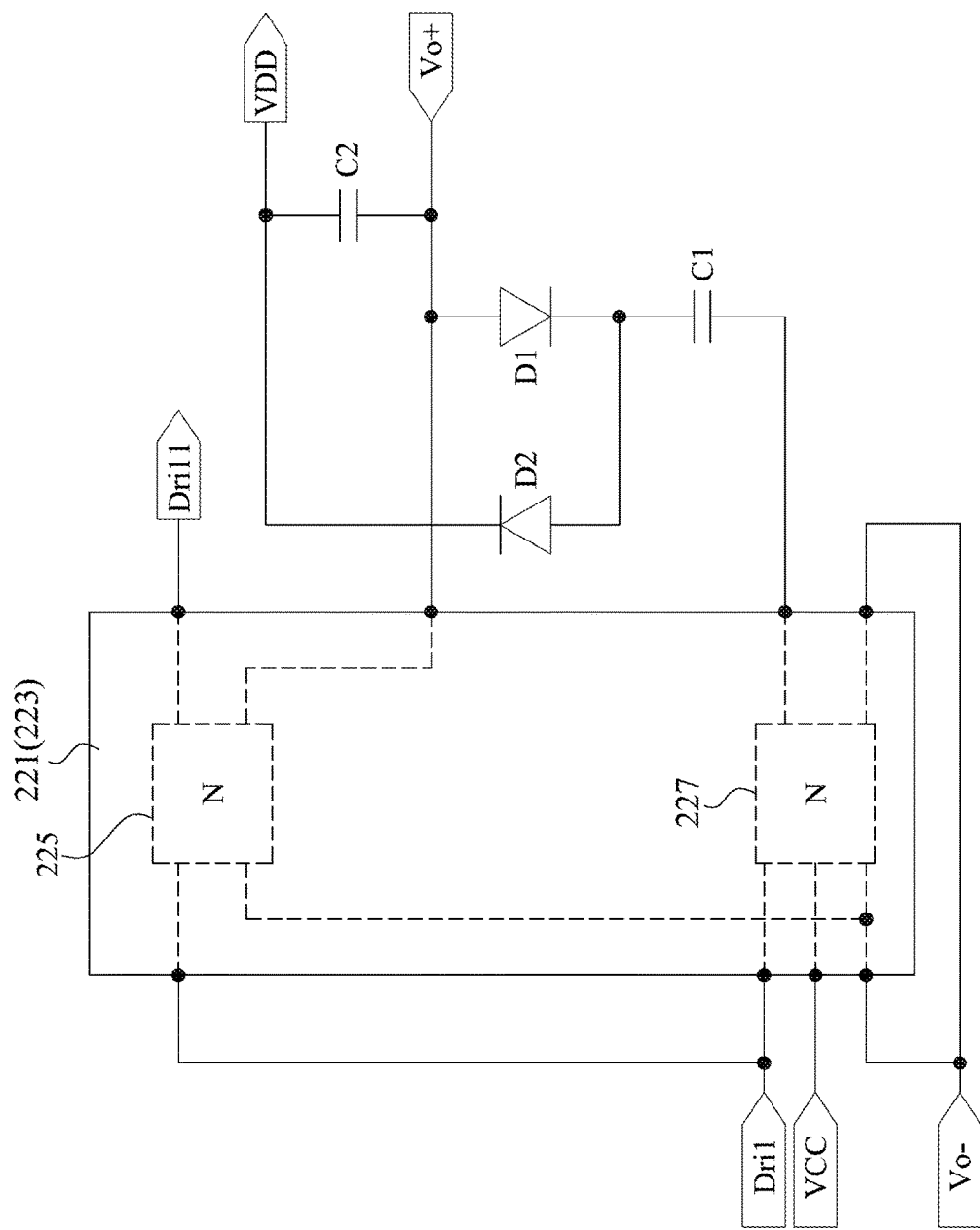
FIG. 3 depicts a schematic diagram of bootstrap circuits of the control device shown in FIG. 1B according to one embodiment of the present disclosure.
Figure 4:
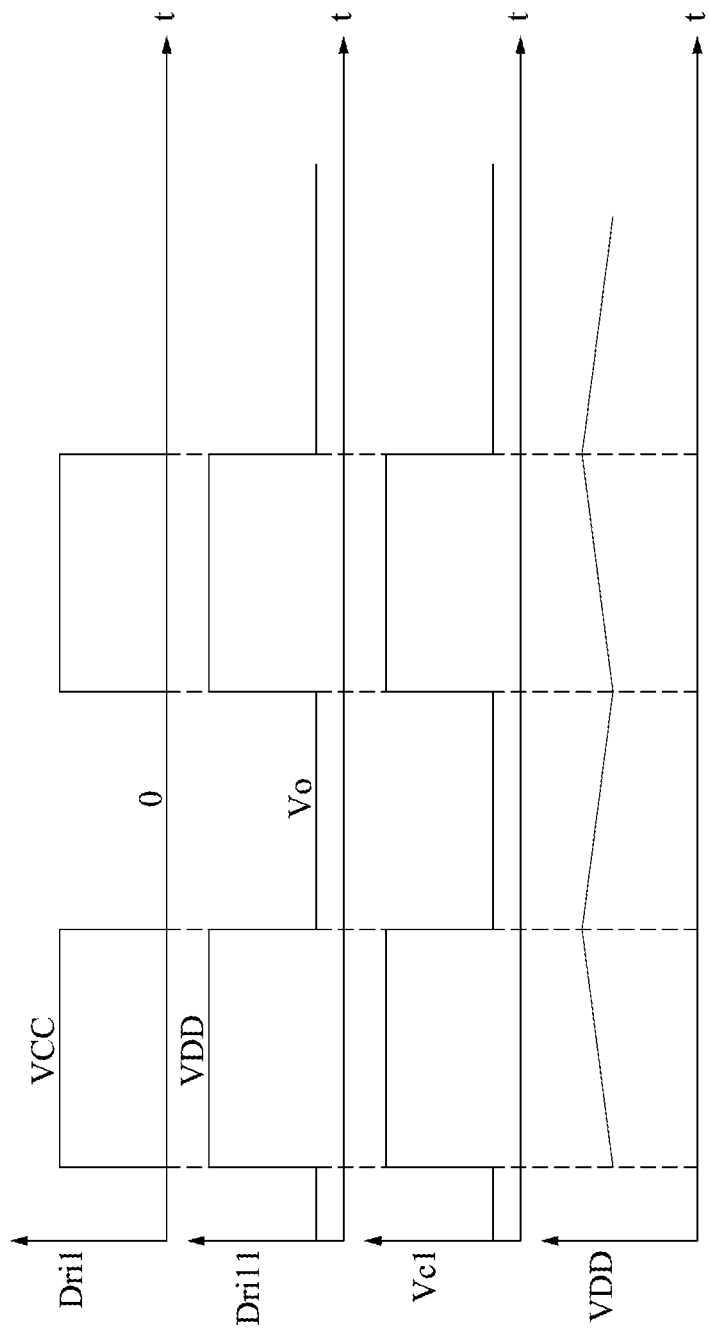
FIG. 4 depicts a schematic diagram of drive waveforms of bootstrap circuits according to one embodiment of the present disclosure.

FIG. 3 depicts a schematic diagram of the bootstrap circuits 221, 223 of the control device 200 shown in FIG. 1B according to one embodiment of the present disclosure. As shown in the figure, the control signal Dri11 generated according to the pulse width modulation signal Dri1 is taken as an example, and the same principle is applied to the control signal Dri12 generated according to the pulse width modulation signal Dri2. In the principle schematic diagram in FIG. 3, input signals are the pulse width modulation signal Dri1, a power supply signal VCC, and a voltage signal Vo. The pulse width modulation signal Dri1, the power supply signal VCC, and the voltage signal Vo take the second negative voltage terminal Vo− as the reference ground. Output signals are the control signal Dri11 and the power supply signal VDD. The control signal Dri11 and the power supply signal VDD take the second positive voltage terminal Vo+ as the reference ground. A description is provided with reference to FIG. 4. FIG. 4 depicts a schematic diagram of drive waveforms of the bootstrap circuits 221, 223 according to one embodiment of the present disclosure. When the pulse width modulation signal Dri1 is 0, the voltage signal Vo charges a capacitor C1 through a diode D1. At this time, a voltage Vc1 is Vo−VD, the VD is a diode voltage drop, and the voltage signal Vo is the voltage difference between the second positive voltage terminal Vo+ and the second negative voltage terminal Vo−. When the pulse width modulation signal Dri1 is high, at this time Vc1 is N·Vcc superimposed on Vo−VD through an N-times isolated amplifier circuit 225 or 227 (N≥1), that is, Vc1=N·Vcc+Vo−VD. At this time, Vc1 is greater than a voltage of the power supply signal VDD. A diode D2 is turned on, and Vc1 charges a capacitor C2 through the diode D2. After several cycles, the voltage of the power supply signal VDD can be equal to N−Vcc+Vo−2·VD, (N≥1). At the same time, the pulse width modulation signal Dri1 passes through another isolated amplifier circuit 227 or 225 to generate the control signal Dri11 based on the second positive voltage terminal Vo+.

In the above application where the first negative voltage terminal on the primary side is shorted with the second positive voltage terminal on the secondary side, for the converter with the same input voltage and the same output voltage compared to the prior art converter, only the transformer ratio of the transformer is changed from N:1:1 to (N−1):1:1, and the primary drive signals take the second positive voltage terminal Vo+ as the reference ground. The voltage and current waveforms are not changed.

Figure 5:
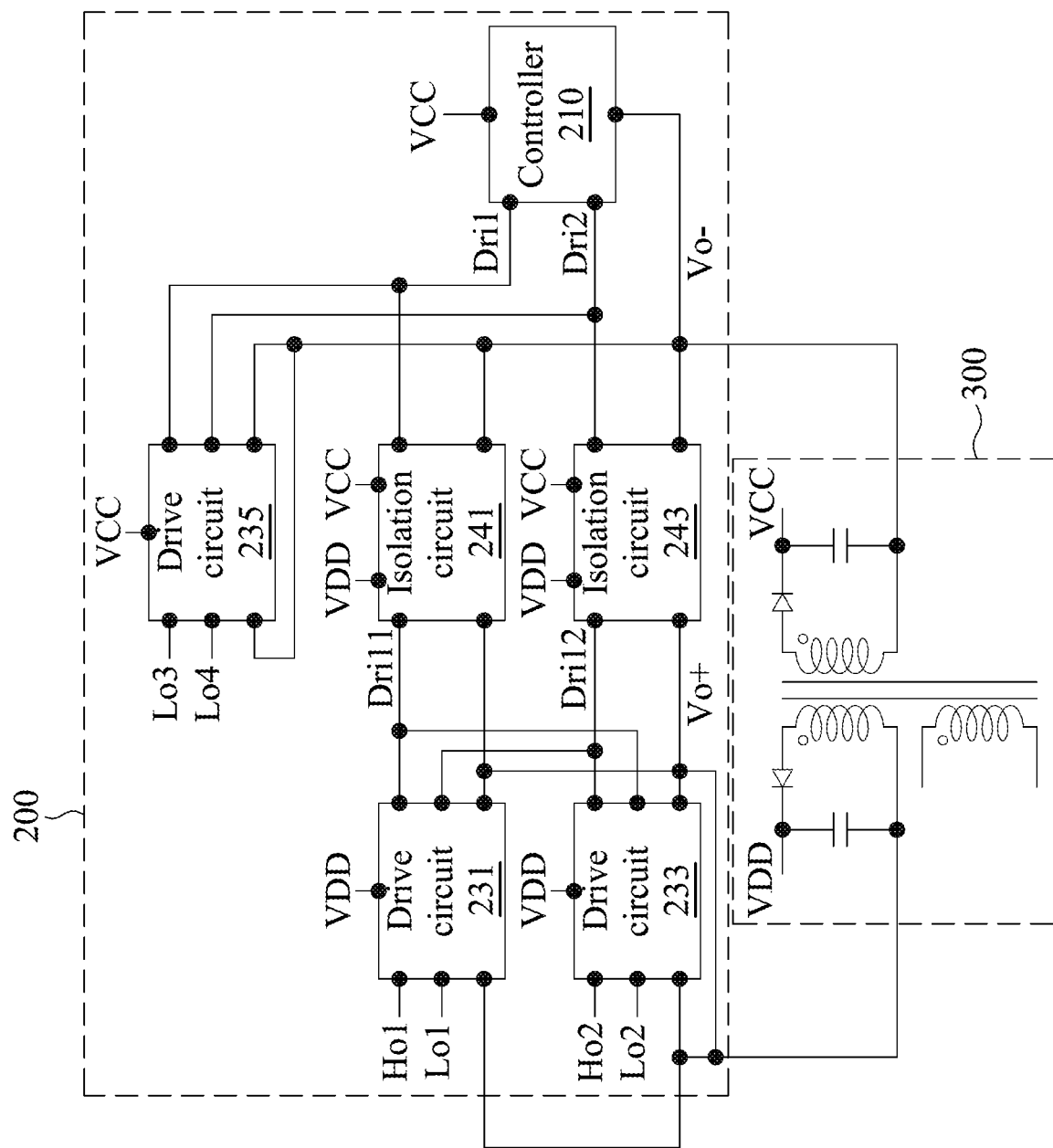
FIG. 5 depicts a schematic diagram of a circuit of a converter according to another embodiment of the present disclosure.

FIG. 5 depicts a schematic diagram of a circuit of the converter 100 according to another embodiment of the present disclosure. As shown in FIG. 5, an isolation power supply 300 can be adopted to generate a VCC power supply and a VDD power supply. The VCC power supply takes the second negative voltage terminal as a reference ground. The VDD power supply takes the second positive voltage terminal as a reference ground. Isolation circuits 241 and 243 generate the control signals Dri11 and Dri12 based on the pulse width modulation signals Dri1 and Dri2. The reference ground is changed from the second negative voltage terminal on the secondary side to the second positive voltage terminal. The drive circuits 231, 233, 235 here are the same as the drive circuits in the embodiment shown in FIG. 1B.

Figure 6A:
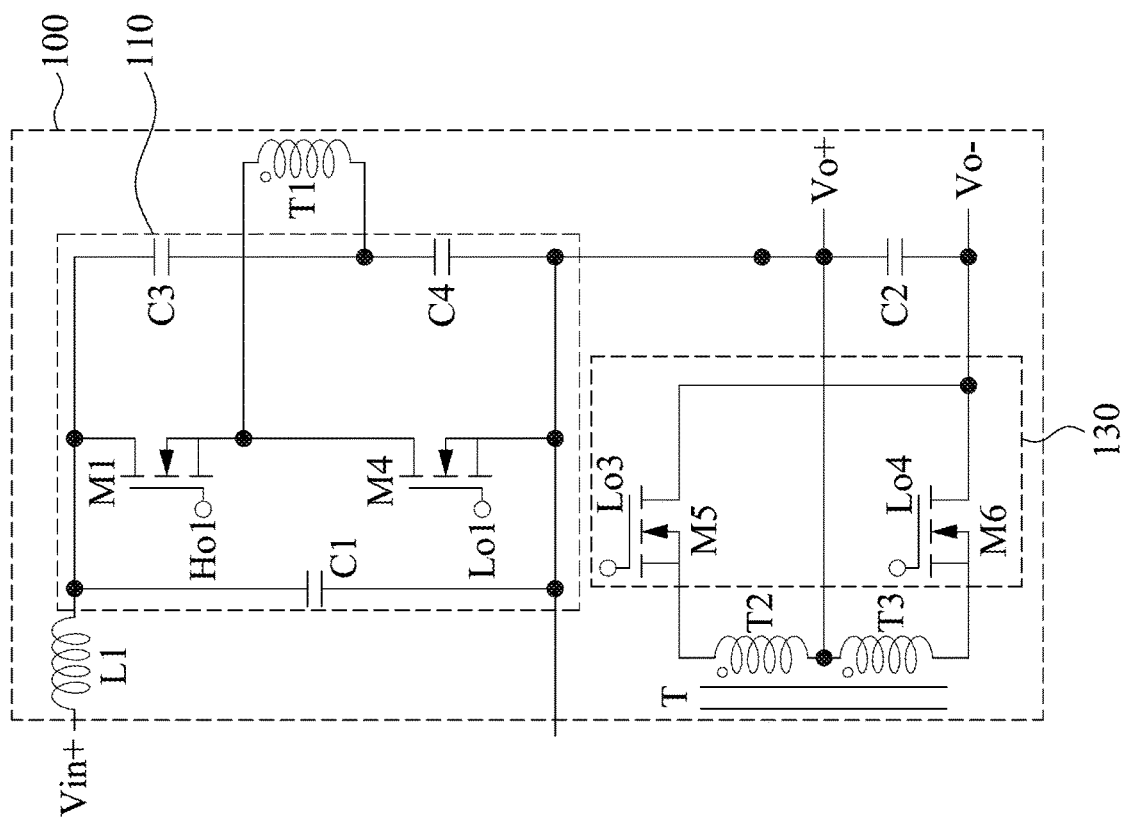
FIG. 6A depicts a schematic diagram of a circuit of a converter according to still another embodiment of the present disclosure.
Figure 6B:
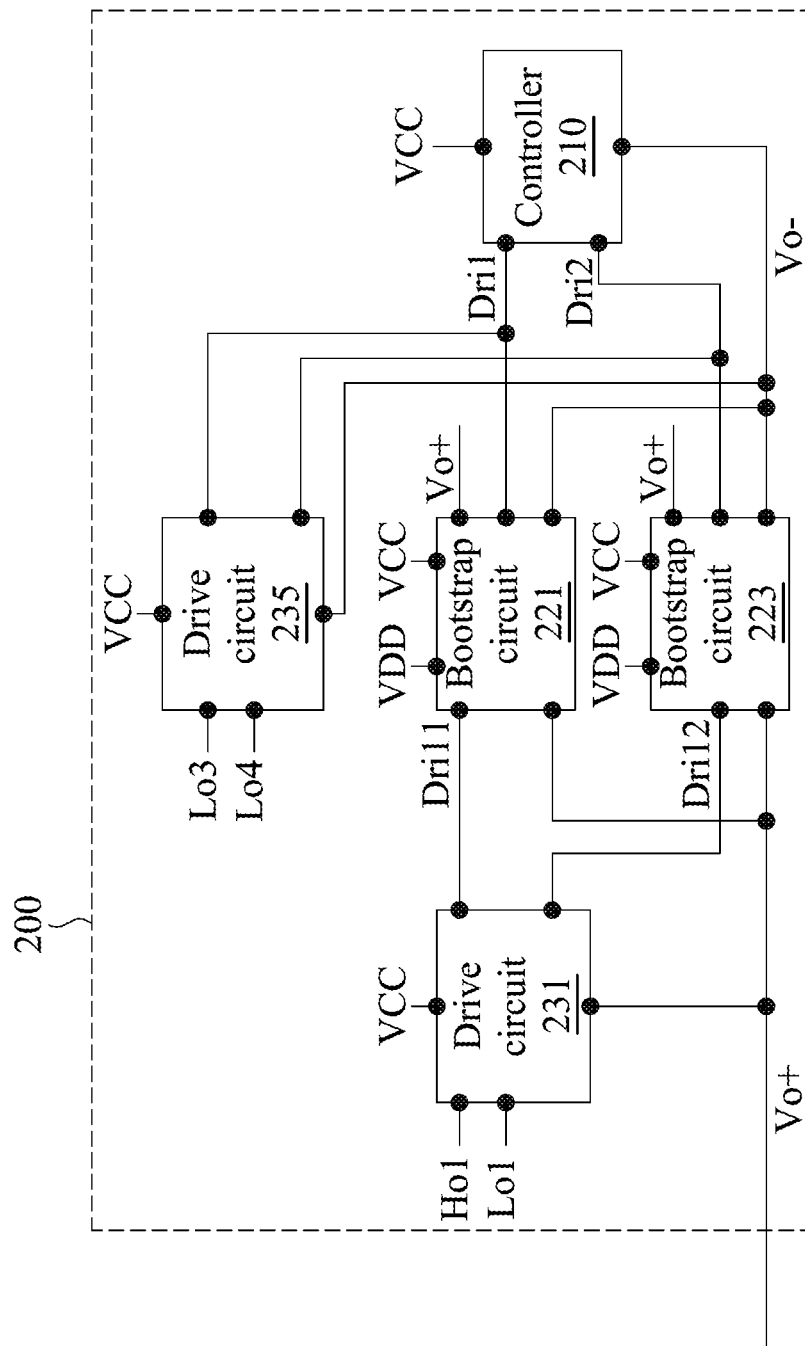
FIG. 6B depicts a schematic diagram of a circuit of a control device of a converter according to another embodiment of the present disclosure.

In another embodiment, the primary side may be a half bridge circuit as shown in FIG. 6A. FIG. 6A depicts a schematic diagram of a circuit of a converter according to still another embodiment of the present disclosure. FIG. 6B depicts a schematic diagram of a circuit of a control device of a converter according to another embodiment of the present disclosure. Similarly, the pulse width modulation signals Dri1 and Dri2 generate the control signals Dri11 and Dri12 that take the second positive voltage terminal Vo+ as the reference ground through the bootstrap circuits 221, 223 or the isolation circuits 241, 243 (In the embodiment of FIG. 6B, the bootstrap circuits 221, 223 are taken as an example. However, the present disclosure may adopt the isolation power supply 300 to cooperate with the isolation circuits 241, 243 as shown in FIG. 5). The reference ground is also changed from the second negative voltage terminal to the second positive voltage terminal. Subsequently, the drive circuit 231 is used to generate the corresponding drive signals Ho1 and Lo1 to control the turning on and turning off of the upper and lower switches of the half bridge circuit.

Reference may be made to the embodiments of FIG. 1A and FIG. 1B for other components. The secondary side may be a full wave rectifier circuit or a half wave rectifier circuit.

Figure 7:
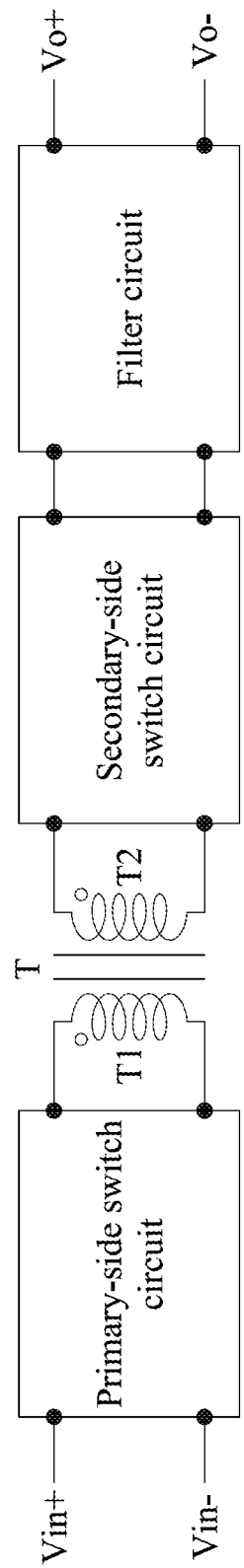
FIG. 7 depicts a circuit block diagram of a converter according to one embodiment of the present disclosure.
Figure 8:
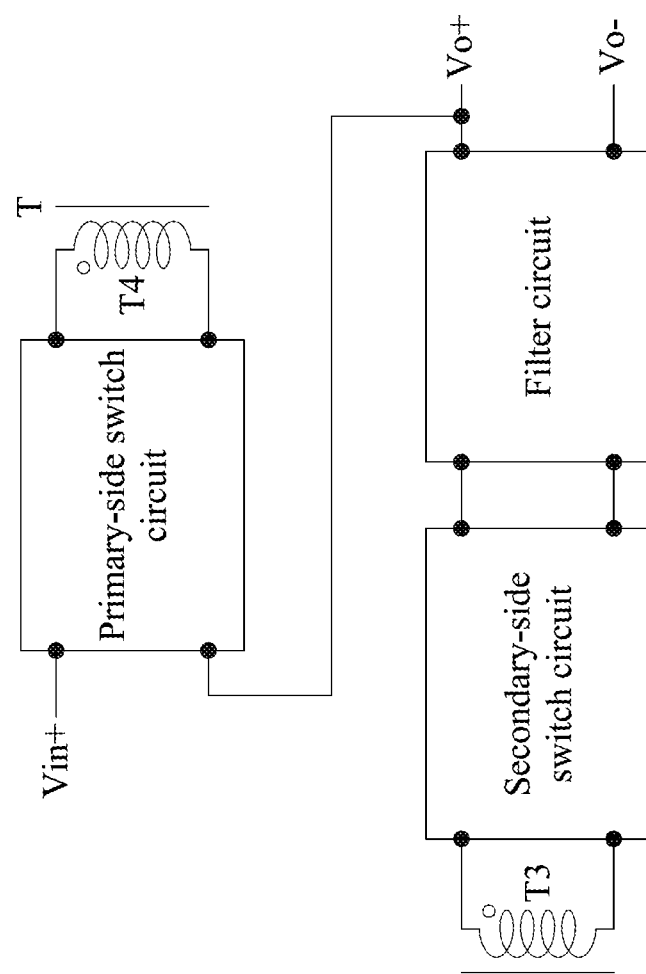
FIG. 8 depicts a circuit block diagram of a converter according to another embodiment of the present disclosure.

In greater detail, the application that the first negative voltage terminal and the second positive voltage terminal are short circuited according to the present disclosure is applicable to the application example in which the converter has a transformer of which the primary and secondary sides do not need to be isolated as shown in FIG. 7. In addition, as shown in FIG. 8, the transformer ratio of the primary-side winding to the secondary-side winding of the transformer according to the present embodiment is changed from the original N:1 to (N−1):1, and the above-mentioned effects can also be achieved.

Figure 9:
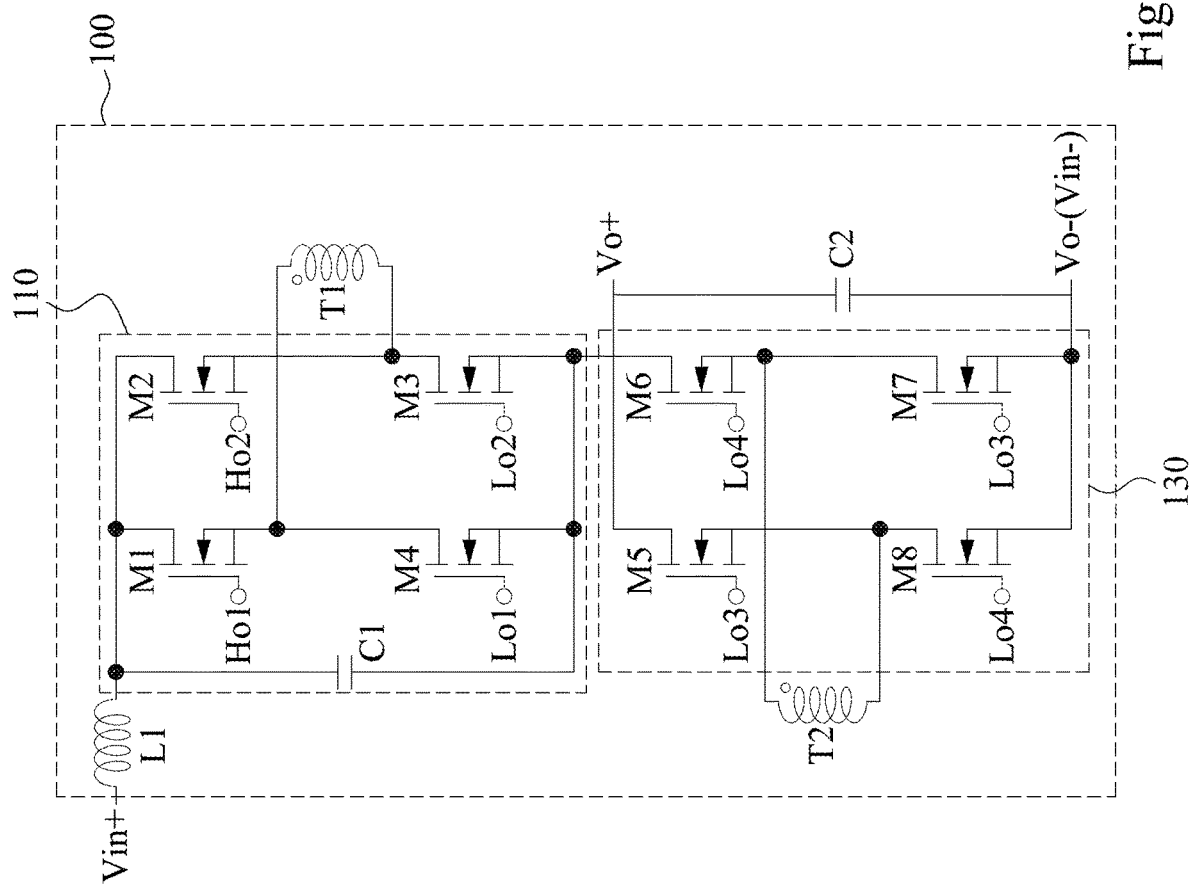
FIG. 9 depicts a schematic diagram of a circuit of a converter according to one embodiment of the present disclosure.

FIG. 9 depicts a schematic diagram of a circuit of a converter according to one embodiment of the present disclosure. As shown in FIG. 9, the secondary-side switching circuit 130 includes a full bridge rectifier circuit.

It is thus understood from the embodiments of the present disclosure that application of the present disclosure has the following advantages. The embodiments of the present disclosure provide a converter to shrink the size of the inductive component of the converter through changing the control method and through using different short-circuiting methods of the primary and secondary sides of the transformer. At the same time, the loss caused by the inductive component is reduced. As a result, the needs for high efficiency and high power density of a converter are satisfied.

It is noted that although the primary side and the secondary side of the transformer are taken as an example for illustrating the first side and the second side of the converter in the above embodiments, the secondary side and the primary side of the transformer may also be taken as an example for illustration. The present disclosure is not limited in this regard.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A converter comprising:
an input capacitor;
a primary-side switching circuit, comprising:
   a first positive voltage terminal coupled to one terminal of an input voltage; and
   a first negative voltage terminal, wherein the first negative voltage terminal and the first positive voltage terminal are coupled to the input capacitor;
a magnetic element circuit coupled to the primary-side switching circuit;
a secondary-side switching circuit coupled to the magnetic element circuit, the secondary-side switching circuit comprising:
   a second positive voltage terminal coupled to the first negative voltage terminal; and
   a second negative voltage terminal coupled to another terminal of the input voltage, and the second negative voltage terminal and the second positive voltage terminal outputting an output voltage together;
an output capacitor coupled to the secondary-side switching circuit; and
a control device, comprising:
   a controller configured to output at least one pulse width modulation signal, wherein a reference ground of the pulse width modulation signal is the second negative voltage terminal;
   at least one bootstrap circuit configured to generate at least one control signal and at least one second power supply signal based on the at least one pulse width modulation signal and at least one first power supply signal, wherein a reference ground of the control signal is the second positive voltage terminal;
   at least one first drive circuit configured to generate at least one first drive signal based on the at least one control signal and the at least one second power supply signal to control the primary-side switching circuit; and
   at least one second drive circuit configured to generate at least one second drive signal based on the at least one pulse width modulation signal and the at least one first power supply signal to control the second-side switching circuit, wherein a reference ground of the at least one first drive signal is the second positive voltage terminal, and a reference ground of the at least one second drive signal is the second negative voltage terminal.

2. The converter of claim 1, wherein a transformer of the magnetic element circuit comprises:
at least one magnetic core;
at least one primary-side winding coupled to the primary-side switching circuit; and
at least one secondary-side winding coupled to the secondary-side switching circuit, wherein the at least one primary-side winding and the at least one secondary-side winding are coupled through the at least one magnetic core.

3. The converter of claim 2, wherein the at least one secondary-side winding of the transformer comprises at least two windings, wherein the at least two windings are connected in series with each other, and a connection point of the at least two windings comprises a center tap, wherein the at least one secondary-side winding of the transformer and the secondary-side switching circuit form a center-tapped full wave rectifier circuit.

4. The converter of claim 1, wherein the primary-side switching circuit comprises a full bridge circuit.

5. The converter of claim 1, wherein the primary-side switching circuit comprises a half bridge circuit.

6. The converter of claim 1, wherein the secondary-side switching circuit comprises a full bridge rectifier circuit.

7. The converter of claim 1, further comprising:
an input inductor receiving the input voltage together with the input capacitor.

8. A converter comprising:
an input capacitor;
a primary-side switching circuit, comprising:
   a first positive voltage terminal coupled to one terminal of an input voltage; and
   a first negative voltage terminal, wherein the first negative voltage terminal and the first positive voltage terminal are coupled to the input capacitor;
a magnetic element circuit coupled to the primary-side switching circuit;

a secondary-side switching circuit coupled to the magnetic element circuit, the secondary-side switching circuit comprising:
- a second positive voltage terminal coupled to the first negative voltage terminal; and
- a second negative voltage terminal coupled to another terminal of the input voltage, and the second negative voltage terminal and the second positive voltage terminal outputting an output voltage together;

an output capacitor coupled to the secondary-side switching circuit, and a control device, comprising:
- a controller configured to output at least one pulse width modulation signal, wherein a reference ground of the pulse width modulation signal is the second negative voltage terminal;
- at least one isolation power supply configured to provide at least one first power supply signal and at least one second power supply signal;
- at least one isolation circuit configured to generate at least one control signal based on the at least one first power supply signal and the at least one pulse width modulation signal, wherein a reference ground of the control signal is the second positive voltage terminal;
- at least one first drive circuit configured to generate at least one first drive signal based on the at least one control signal and the at least one second power supply signal to control the primary-side switching circuit; and
- at least one second drive circuit configured to generate at least one second drive signal based on the at least one pulse width modulation signal and the at least one first power supply signal to control the secondary-side switching circuit, wherein a reference ground of the at least one first drive signal is the second positive voltage terminal, and a reference ground of the at least one second drive signal is the second negative voltage terminal.

9. The converter of claim 8, wherein a transformer of the magnetic element circuit comprises:
- at least one magnetic core;
- at least one primary-side winding coupled to the primary-side switching circuit; and
- at least one secondary-side winding coupled to the secondary-side switching circuit, wherein the at least one primary-side winding and the at least one secondary-side winding are coupled through the at least one magnetic core.

10. The converter of claim 9, wherein the at least one secondary-side winding of the transformer comprises at least two windings, wherein the at least two windings are connected in series with each other, and a connection point of the at least two windings comprises a center tap, wherein the at least one secondary-side winding of the transformer and the secondary-side switching circuit form a center-tapped full wave rectifier circuit.

11. The converter of claim 8, wherein the primary-side switching circuit comprises a full bridge circuit.

12. The converter of claim 8, wherein the primary-side switching circuit comprises a half bridge circuit.

13. The converter of claim 8, wherein the secondary-side switching circuit comprises a full bridge rectifier circuit.

14. The converter of claim 8, further comprising:
- an input inductor receiving the input voltage together with the input capacitor.

* * * * *